United States Patent
Stanton et al.

(10) Patent No.: US 7,784,503 B2
(45) Date of Patent: Aug. 31, 2010

(54) VISCOUS MATERIAL METERING SYSTEM AND METHOD

(75) Inventors: Jennifer L. Stanton, Clifton Park, NY (US); Harry A. Bayly, Mechanicville, NY (US); Roger Knox, Clifton Park, NY (US)

(73) Assignee: Momentive Performance Materials, Albany, NY (US)

( * ) Notice: Subject to any disclaimer, the term of this patent is extended or adjusted under 35 U.S.C. 154(b) by 1006 days.

(21) Appl. No.: 11/536,700

(22) Filed: Sep. 29, 2006

(65) Prior Publication Data

US 2008/0087150 A1   Apr. 17, 2008

(51) Int. Cl.
B65B 1/04 (2006.01)

(52) U.S. Cl. ......... 141/102; 141/105; 141/125; 222/58; 222/80; 222/405; 83/350

(58) Field of Classification Search .......... 141/1, 141/102, 105, 121–125, 258, 264; 222/58, 222/80, 319, 320, 405, 548–550, 544, 559–561; 83/350, 356.2, 651.1; 425/140, 142, 242
See application file for complete search history.

(56) References Cited

U.S. PATENT DOCUMENTS

| | | | | |
|---|---|---|---|---|
| 2,752,118 | A | * | 6/1956 | Haile ............... 177/77 |
| 2,895,648 | A | * | 7/1959 | Woughter ........... 222/235 |
| 4,067,483 | A | | 1/1978 | Mucke |
| 4,071,168 | A | | 1/1978 | Stone |
| 4,154,044 | A | | 5/1979 | Lang |
| 4,221,102 | A | | 9/1980 | Lang |
| 4,284,597 | A | | 8/1981 | Stein |
| 4,402,428 | A | | 9/1983 | Lang |
| 4,448,272 | A | | 5/1984 | Keller et al. |
| 4,448,736 | A | | 5/1984 | Emery et al. |
| 4,693,397 | A | | 9/1987 | Lang |
| 4,874,022 | A | | 10/1989 | Schwerdtel |
| 4,900,241 | A | * | 2/1990 | Sigurdsson ........ 425/140 |
| 4,986,717 | A | | 1/1991 | Cummins et al. |
| 5,078,304 | A | | 1/1992 | Schneider |
| 5,137,368 | A | | 8/1992 | Kistner |
| 5,335,185 | A | | 8/1994 | Pitts et al. |
| 5,360,146 | A | | 11/1994 | Ikushima |
| 5,377,815 | A | | 1/1995 | Vetter |

(Continued)

Primary Examiner—Gregory L Huson
Assistant Examiner—Jason K Niesz
(74) Attorney, Agent, or Firm—Philip D. Freedman PC; Philip D. Freedman; Kenneth S. Wheelock

(57) ABSTRACT

A viscous material metering system comprises a cutting apparatus comprising a tensioning fork having a main body diverging into extending tines; a cutting wire tensioned between the tines of the fork; and a driving mechanism operatively connected to the tensioning fork to drive the fork and tensioned cutting wire; and a controller controllably connected to the driving mechanism and having a set of instructions to control the driving mechanism to drive the fork to cut a continuous viscous material into portions of a predetermined size or weight for metering to a viscous material compounding system. A viscous material metering method comprises determining a sequential portion of viscous material to be metered from a container to a viscous material compounding system; metering portions of the continuous viscous material to the compounding system by cutting the material substantially perpendicular to a longitudinal axis of an elongated continuous viscous material feed expressed from the container; and controlling the cutting to meter the determined sequential portion.

15 Claims, 7 Drawing Sheets

U.S. PATENT DOCUMENTS

| | | |
|---|---|---|
| 5,417,169 A | 5/1995 | Carpenter |
| 5,460,209 A | 10/1995 | Jandur et al. |
| 5,671,873 A | 9/1997 | Hammerl |
| 5,797,516 A * | 8/1998 | Brandl .................. 222/80 |
| 6,061,608 A | 5/2000 | Moldavsky |
| 6,211,267 B1 | 4/2001 | Suto |
| 6,391,234 B1 | 5/2002 | Silvi |
| 6,414,054 B1 | 7/2002 | Boffard |
| 6,444,154 B1 | 9/2002 | Boudreau |
| 6,474,971 B1 | 11/2002 | Dong |
| 6,572,253 B2 | 6/2003 | Silvi |
| 6,604,559 B2 | 8/2003 | Rubin |
| 6,749,786 B2 | 6/2004 | Boudreau |
| 2005/0241774 A1 | 11/2005 | Hart |
| 2005/0278957 A1 * | 12/2005 | McCullough .............. 30/279.6 |

* cited by examiner

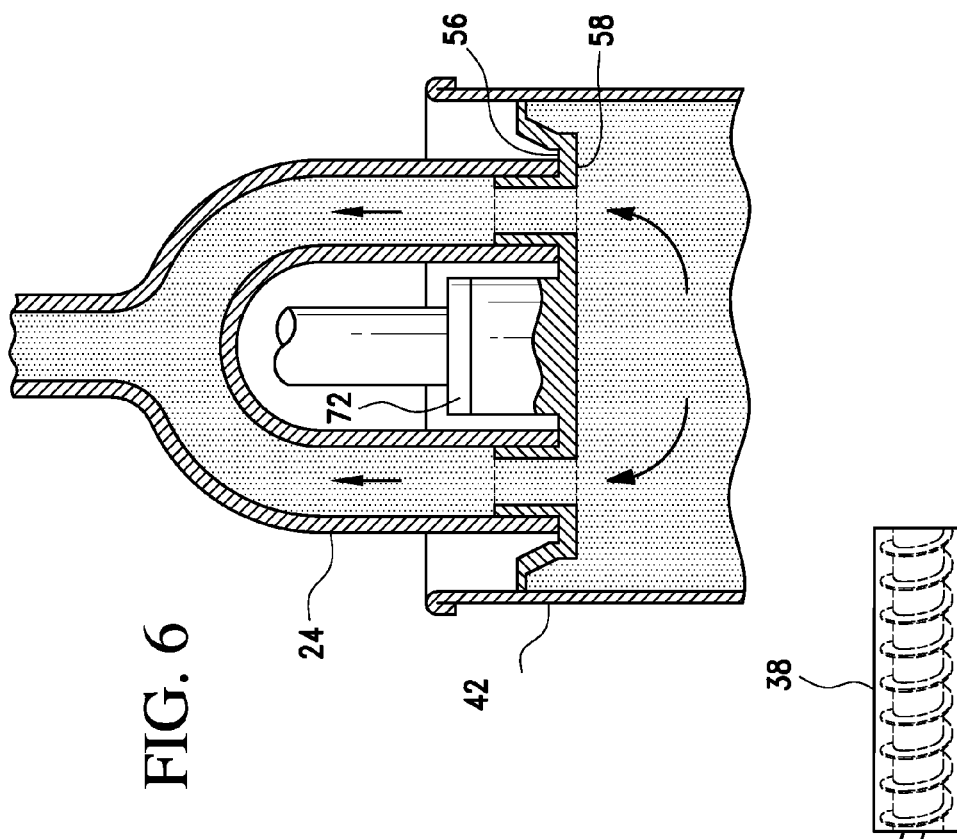
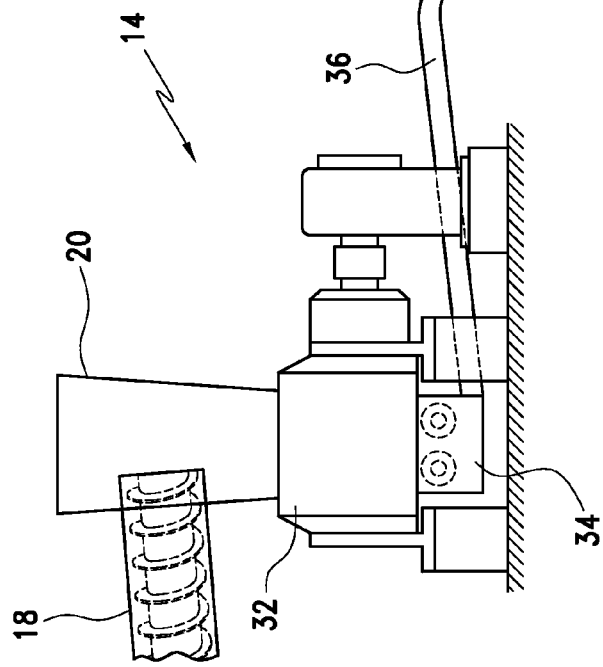

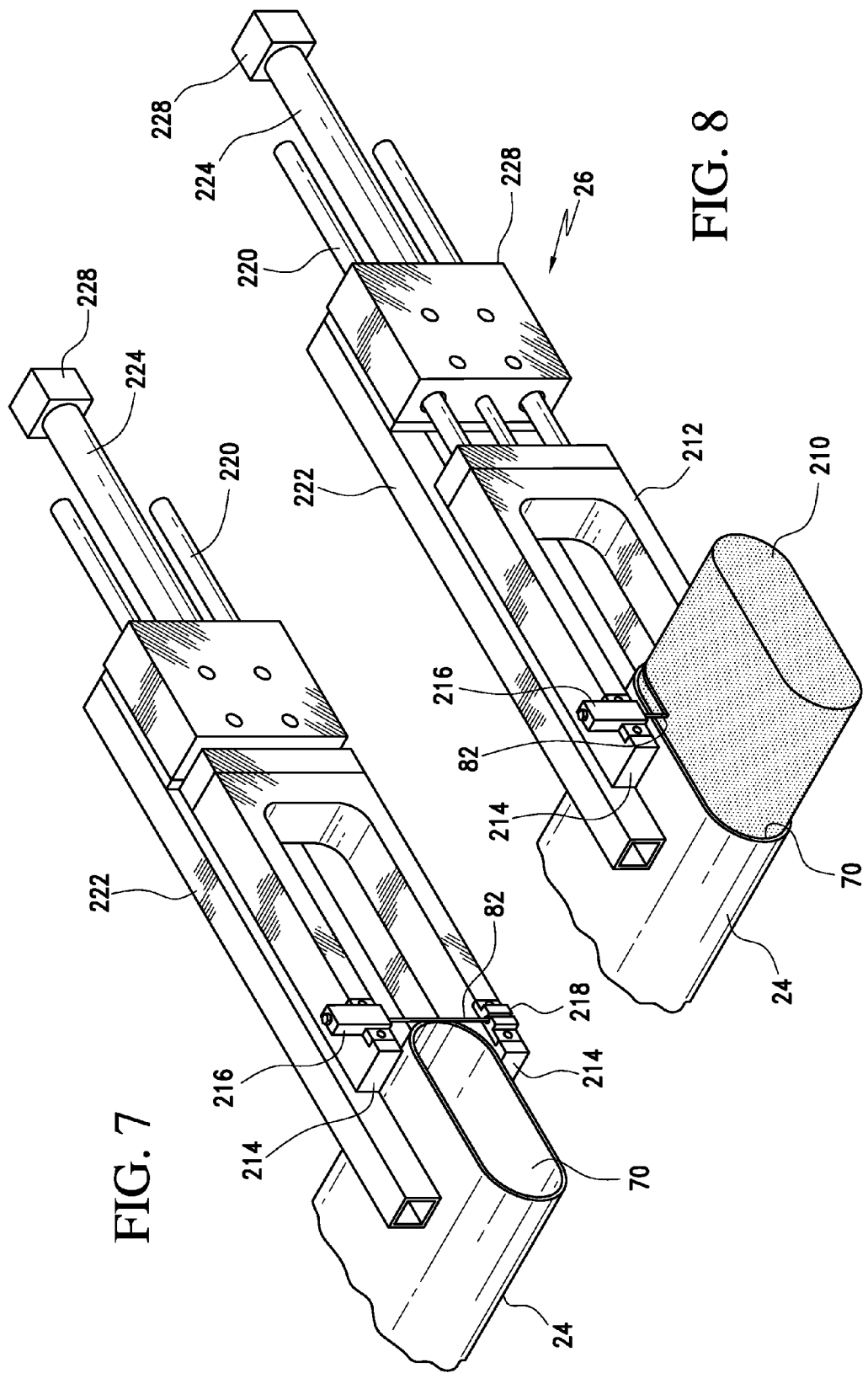

VISCOUS MATERIAL METERING SYSTEM AND METHOD

BACKGROUND OF THE INVENTION

The invention relates to a viscous material metering system and method, in particular for supplying an organosiloxane (silicone) gum or other viscous material to a continuous compounding system.

In a compounding system, a material is fed to a processing line where feed is mixed and additives are injected in proportions to produce a customized product. The system requires precise and reliable dosing and feed operations to achieve uniform products with narrow tolerance properties. Accurately metering the material in a feed step can be critical to proper system operation.

However, it is difficult to separate an accurate quantity of a viscous material to feed a system from a bulk of the material. Accurate separation is difficult because of slow response of the viscous material to change in feed rate and because of the difficulty in separating a metered size or weight of the viscous material from a bulk of the material. The material may be resistant to pouring or if it can be poured, pour rate is extremely slow. A viscous material may exhibit high levels of adhesion or tendency to stick to other materials and/or cohesion or a tendency to remain stuck to itself and therefore resistant to separation. The viscous material may be shear thickening, exhibiting increasing viscosity as shear on the material is increased. It is difficult to feed accurate quantities of such materials so that an amount in a process can be controlled.

In some viscous material processes, a cutting tool such as a knife, blade or scissors is used to cut or dice portions of the material from a bulk or other quantity supply. For example, a feed portion of viscous material can be cut from a large bulk mass, from a pulled relatively thin cross-sectional string or from a generally cylindrical-shape of the viscous material by such tools. However, a relatively large force may be required and time and machinery may be required to move a blade or the like through a viscous material. Another disadvantage to moving a blade or the like through the material is the adherence of the material to the blade, especially if the material is sticky (highly adhering). The cutting tool may require frequent cleaning to remove accumulation of stuck material. Also, as the material sticks to the cutting tool, the force and work required to move a cutting tool through the material further increases.

Accordingly, there is a need to facilitate separating difficult-handling viscous material. Also, there is a need to accurately cut defined quantities of such material from a bulk quantity, regardless of the form of the bulk quantity and there is a need to accurately charge a viscous material to a processing system.

BRIEF DESCRIPTION OF THE INVENTION

The invention provides an improved viscous material metering system and method to accurately cut defined quantities of such material from a bulk quantity, regardless of the form of the bulk quantity.

In an embodiment, the invention is a viscous material metering system, comprising: a cutting apparatus comprising a tensioning fork having a main body diverging into extending tines; a cutting wire tensioned between the tines of the fork; and a driving mechanism operatively connected to the tensioning fork to drive the fork and tensioned cutting wire; and a controller controllably connected to the driving mechanism and having a set of instructions to control the driving mechanism to drive the fork to cut a continuous viscous material into portions of a predetermined size or weight for metering to a viscous material compounding system.

In another embodiment, the invention is a viscous material metering method, comprising: determining a sequential portion of viscous material to be metered from a container to a viscous material compounding system; metering portions of the continuous viscous material to the compounding system by cutting the material substantially perpendicular to a longitudinal axis of an elongated continuous viscous material feed expressed from the container; and controlling the cutting to meter the determined sequential portion.

Another embodiment is a viscous material metering system, comprising: a cutting apparatus comprising a tensioning fork having a main body diverging into extending tines; a cutting wire tensioned between the tines of the fork; and a driving mechanism operatively connected to the tensioning fork to drive the fork and tensioned cutting wire; a controller controllably connected to the driving mechanism and having a set of instructions to control the driving mechanism to drive the fork to cut a continuous viscous material into portions of a predetermined size or weight; and a compounding system that receives cut portions of the silicone gum for compounding.

Another embodiment is a method of controlling a silicone gum feed to a processing system, comprising: determining a size or weight portion of a silicone gum for processing; evacuating silicone gum from a container to form a continuous feed; cutting the silicone gum continuous feed; and controlling the cutting of the silicone gum continuous feed to cut the feed into the determined size or weight portion.

Another embodiment is a silicone gum cutting system, comprising: a cutting apparatus comprising a tensioning fork having a main body diverging into extending tines; a cutting wire, tensioned by a tensioning block and anchor between the tines of the fork; and a driving mechanism operatively connected to the tensioning fork to drive the fork and tensioned cutting wire; and a controller connected in a sensing relationship to the driving mechanism and having a set of instructions to (i) store an input value representing a set point weight of viscous material to be charged to the viscous material compounding system, (ii) sense an initial combined weight of the container evacuator, feed tube, cutting apparatus and a container with viscous material; (iii) sense a progressing combined weight of the container evacuator, feed tube, cutting apparatus and a container with viscous material as material is metered by the cutting apparatus; (iv) calculate a material weight charged from the metering system to a subsequent viscous material compounding system according to a difference between the initial combined weight and the sensed progressing combined weight; (v) increase the rate of metering of material by the cutting apparatus when the calculated material weight charged is within a first predetermined range of the set point; and (v) terminate the material charging when a calculated charged material weight is within a second predetermined range of the set point.

Another embodiment is a method for feeding silicone gum to a compounding process, comprising: evacuating silicone gum from a container by a feed system for charge to a silicone gum compounding process; monitoring a weight of the combined feed system, container and silicone gum held within the container as silicone gum is evacuated; determining an amount of silicone gum charged to the compounding process according to a difference between the initial weight and a monitored weight of the combined feed system, container and silicone gum held within the container as silicone gum is evacuated; and controlling a rate of dicing silicone gum that is evacuated from the container for feed to the compounding process according to the determined amount of charged silicone gum.

Still another embodiment is a silicone gum feed system, comprising: a drum press located on a loss of weight scale; a feed tube that receives material expressed from a drum by the drum press; a cutting apparatus that meters material from the feed tube to a processing system according to loss of weight sensed by the scale; and a controller with a set of instructions to store an initial weight, monitor a continuing weight, determine weight of silicone gum fed to the processing system according to a difference between the initial weight and the monitored weight and controlling a rate of the cutting apparatus according to the difference.

Still another embodiment is a method of controlling a feed to a processing system, comprising: establishing a material feed session set point range; feeding a viscous material in the session by dicing a steadily moving material into a portion that drops sequentially into the processing system; monitoring a session total of material dropped into the processing system; comparing the session total of material to the session set point range; increasing a cutting rate of the moving material to decrease each cut portion quantity as the session set point range is approached; and terminating the material feed of the session when the total material is within the session set point range.

In another embodiment, the invention is a material feed system, comprising: a material extracting apparatus; and a controller with a set of instructions: to (i) refer to a look-up data base to determine a set point for a material to be charged to a compounding system; (ii) sense an initial combined weight of a material extracting apparatus and a container with material; (iii) signal commencement of operation of the material extracting apparatus to evacuate material from the container; (iv) sense a progressing combined weight of the material extracting apparatus and the container with material; (v) calculate a charged material weight according to a difference between the initial combined weight and the sensed progressing combined weight; and (vi) terminating the material extracting apparatus operation when a calculated charged material weight is within a predetermined range of the set point.

In another embodiment, the invention is a process to feed a material compounding system, comprising: referring to a look-up data base to determine a set point for a material to be charged to the compounding system; sensing an initial combined weight of a material extracting apparatus and a container with material; signaling commencement of a material extracting apparatus operation to evacuate the material from the container; sensing a progressing combined weight of the material extracting apparatus and the container with material; calculating a charged material weight according to a difference between the initial combined weight and the sensed progressing combined weight; and terminating the material extracting apparatus operation when a calculated charged material weight is within a specified range of the set point.

Another embodiment of the invention is a controller for a feed to a processing system, comprising a set of instructions to establish a material feed session set point range; to direct feeding a viscous material in the session by dicing a steadily moving material into a portion that drops sequentially into the processing system; to monitor a session total of material dropped into the processing system; to compare the session total of material to the session set point range; to increase a dicing rate of the moving material to decrease each cut portion quantity as the session set point range is approached; and to terminate the material feed of the session when the total material is within the session set point range.

And another embodiment of the invention is viscous material processing system, comprising: a container evacuator; a controller that drives the container evacuator; a feed tube that receives material expressed from a container by the container evacuator according to the controller; and a cutting apparatus that severs material from the feed tube to meter the material to a processor according to the controller.

Another embodiment of the invention is a method of feeding a processing system, comprising: setting a total batch viscous material feed to a compounding system; initiating a feed of the viscous material at a first set feed rate by dicing feed material at a first size or weight aliquot; monitoring the feed rate and total batch viscous material feed; changing the first size or weight aliquot to a second smaller size or weight aliquot as the total viscous material feed approaches a set point to provide an improved control of quantity of the batch viscous material feed.

Another embodiment of the invention is a method of controlling feed to a processing system, comprising: sensing a first weight of a combined viscous feed system, container and viscous material within the container; expressing a cut portion viscous material from the container and viscous feed system to a processing system; sensing a subsequent weight of the combined viscous feed system, container and viscous material within the container; and determining a quantity of viscous material fed to the processing system by a difference between the first weight and the subsequent weight; and controlling an expressed cut portion of viscous material according to the quantity of viscous material fed to the processing system.

Another embodiment of the invention is a silicone gum processing system, comprising: a silicone gum compounding system; and a viscous material feed system to the compounding system, the feed system comprising a cutting apparatus that meters material according to weight of material charged to the compounding system as monitored by a controller.

And, another embodiment of the invention is a method of processing silicone gum, comprising: monitoring weight of material charged to a silicone gum compounding system; controlling the metering of material to the compounding system by a cutting apparatus according to the monitored weight of charged material; and compounding charged silicone gum in the compounding system.

BRIEF DESCRIPTION OF THE DRAWING

FIG. 1, FIG. 2 and FIG. 3 are schematic representations of a material processing system;

FIG. 6 is a cut away view of a section of a drum press;

FIG. 7 and FIG. 8 are schematic perspective views of a cutting apparatus; and

DETAILED DESCRIPTION OF THE INVENTION

The invention relates to the handling of a viscous material such as a silicone gum. In this application, "silicone gum" is a viscous silicone including a gum and a rubber. A silicone or polysiloxane or organopolysiloxane has the chemical formula $[R_2SiO]_n$, where R=organic groups such as methyl, ethyl, and phenyl. These materials typically comprise an inorganic silicon-oxygen backbone ( . . . —Si—O—Si—O—Si—O— . . . ) with attached organic side groups, which can be four-coordinate. In some cases organic side groups can be used to link two or more of these —Si—O— backbones together.

By varying the —Si—O— chain lengths, side groups, and crosslinking, silicones can be synthesized with a wide variety of properties and compositions. They can vary in consistency from liquid to gel to rubber to hard plastic. Silicone rubber or silicone gum is a silicone elastomer, typically having high temperature properties. Silicone gum offers resistance to extreme temperatures, being able to operate normally from minus 100° C. to plus 500° C. In such conditions tensile strength, elongation, tear strength and compression set can be superior to conventional rubbers.

A silicone gum can be extruded or molded into custom shapes and designs such as tubes, strips, solid cord or custom profiles within size restrictions specified by a manufacturer. Cord can be joined to make "O" Rings and extruded profiles can also be joined to make up seals.

The invention provides a system and method to cut or meter difficult to handle viscous materials such as a silicone gum. In this application, "meter" means to supply in a measured or regulated amount. "Cut" means to sever, separate or detach from a main body. A "set point" is a target weight of material to be charged into a compounding system from a continuous feed system.

Features of the invention will become apparent from the drawings and following detailed discussion, which by way of example without limitation describe preferred embodiments of the invention.

Figure 1:
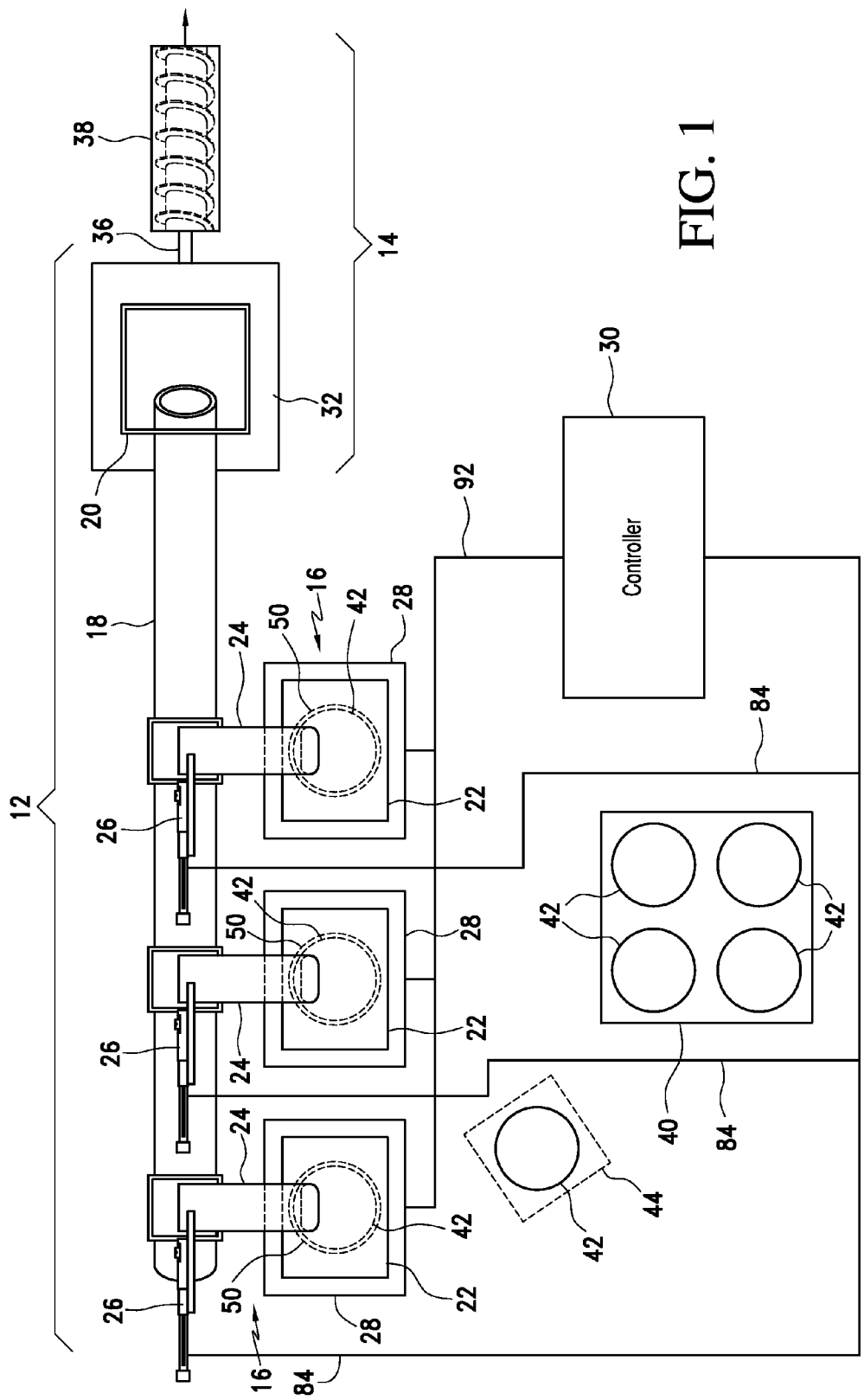
Figure 2:
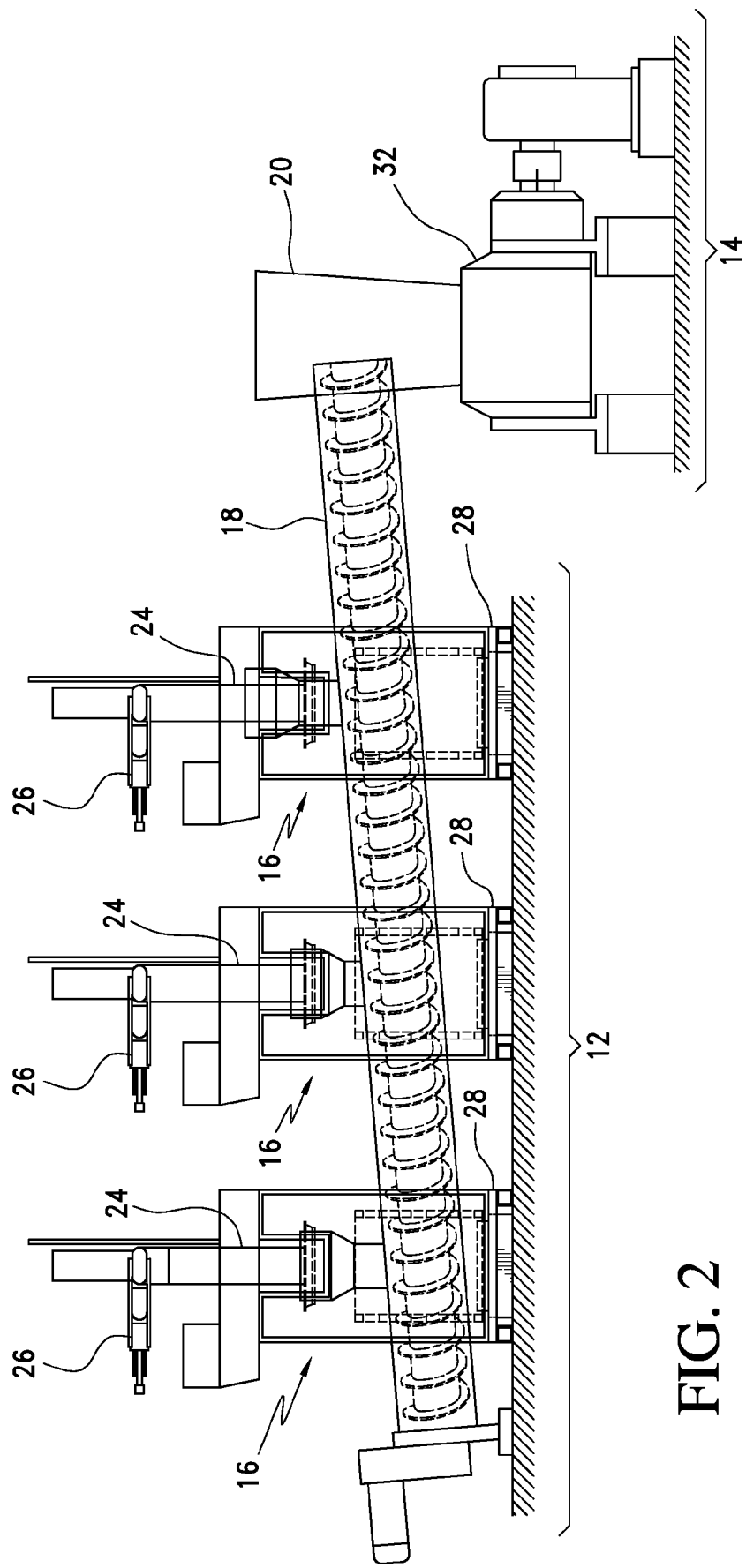
Figure 4:
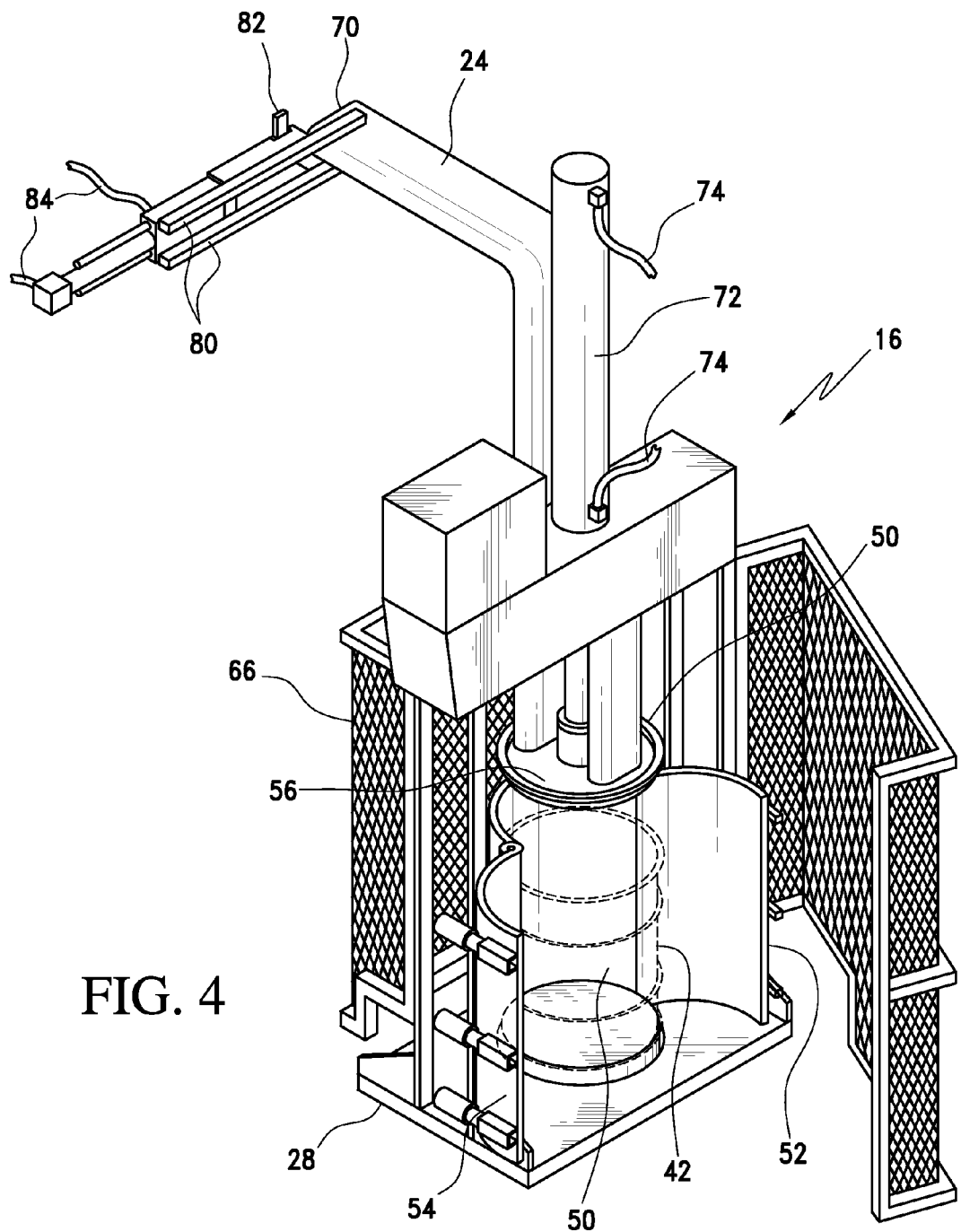
FIG. 4 and FIG. 5 are perspective views of a drum press.
Figure 5:
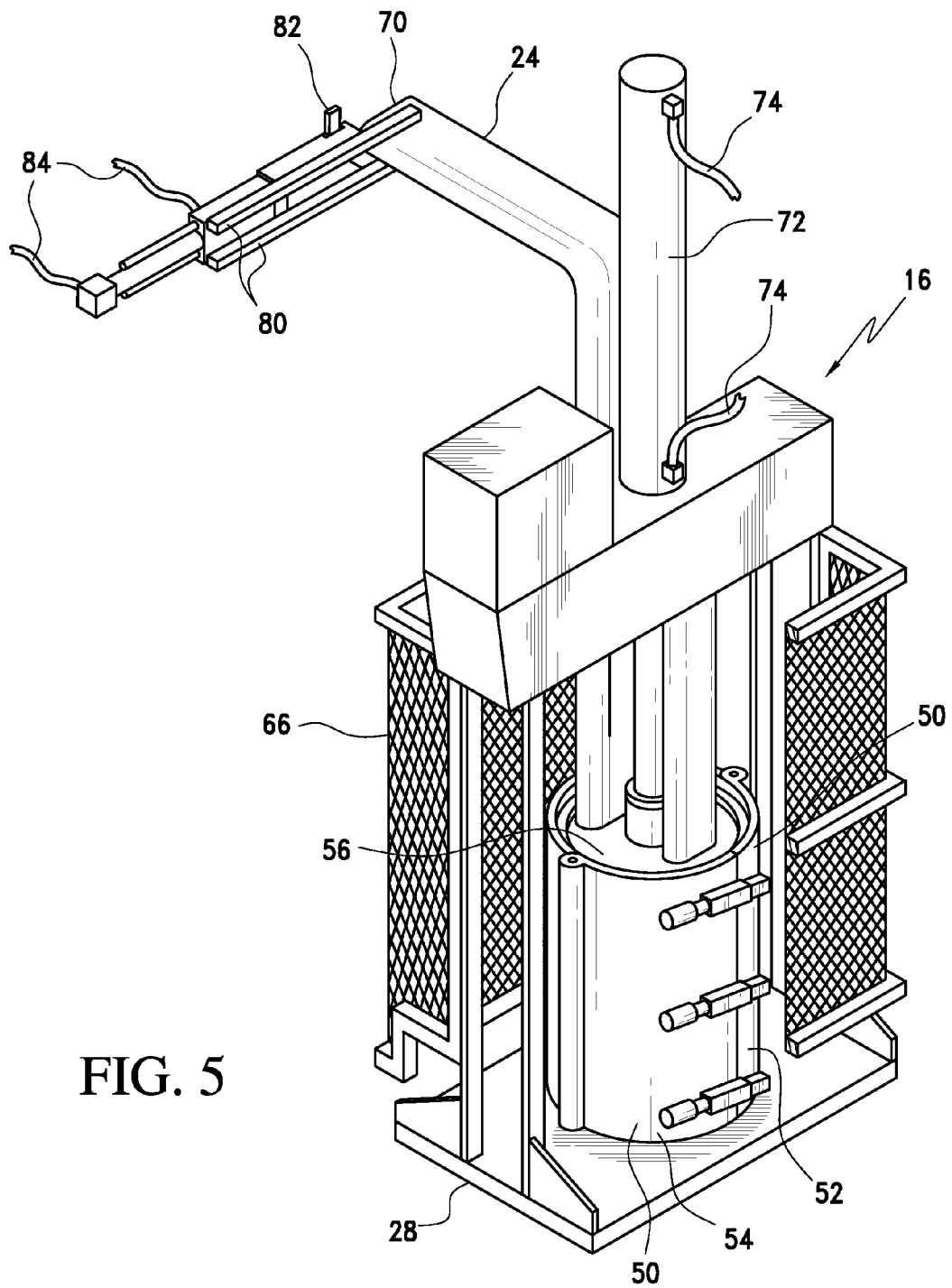

The invention relates to a material feed system and method for feeding viscous material such as a silicone gum to a processing system. A preferred invention embodiment shown in the drawings illustrates the invention as a process to compound silicone gum into a base for forming articles. In the drawings, FIG. 1 is a schematic top view representation and FIG. 2 is a schematic side view representation of a material processing system 10 showing an integrated feed system 12 and compounding system 14. The feed system 12 includes a material extractor apparatus (MEA) 16, conveyor 18 and chute 20. FIG. 4 and FIG. 5 are detailed elevation views of the MEA 16 and FIG. 6 is a cut away side sectional view of a section of the MEA 16. The MEA 16 includes container evacuator 22, feed tube 24, cutting apparatus 26 and floor scale 28. The integrated feed system 14 is controllably connected to controller 30. FIG. 6 is a schematic side view of compounding system 14. As shown in FIG. 1, FIG. 2 and FIG. 3, compounding system 14 includes mixer 32, roll mill 34, conveyor belt 36 and compounder 38.

The MEA 16 serves to express the viscous material from a container to the compounding system 14. In one operation, 55-gallon steel drums from a pallet are dumped into totes and the totes (approx. 80 pounds each) are dumped into a Banbury mixer. However, manually maneuvering drums from pallets can cause back and shoulder strains and injuries. In a preferred compounding operation of the invention with respect to FIG. 1, FIG. 2 and FIG. 3, operation commences with delivery of a pallet 40 of four drums 42 of gum. While the container can be any material holding enclosure, the drawings embodiment includes a drum with a cylindrical wall of steel, fiberboard or other material suitable for transporting a silicone gum material. The drum 42 has opposite ends, each of which is openable to accommodate a movable plunger at one end as hereinafter described.

The material in each drum 42 may be identical or it may be of a variety of differing physical properties such as viscosity. The drums 42 are removed from the pallet 40 one by one by drum hauler 44 such as from Easy Lift Equipment Co., Inc., 2 Mill Park Court, Newark, Del. 19713. The lid of each of three drums 42 is removed and each of the drums 42 is loaded by the hauler 44 into a respective container evacuator 42, which may be a Schwerdtel S 6-F drum press from Schwerdtel Corporation, 40 Whitney Road, Mahwah, N.J. 07430. Use of the drum hauler 44 eliminates ergonomic risks associated with lifting and handling the heavy drums 42.

The silicone gum is forced from each drum as a continuous flow that must be metered into weight or sized portions into the conveyor 18. In the drawings embodiment, the MEA 16 comprises a container evacuator 22, feed tube 24 and cutting apparatus 26. The container evacuator 22 can be a drum press, which is a device that evacuates viscous or compacted contents from a drum. As illustrated in FIG. 2 and FIG. 3, the container evacuator 22 is a press that comprises a substantially cylindrical chamber 50 with hinged closures 52 and 54 for securing a drum 42 removably within the chamber 50. The chamber 50 and hinged closures 52 and 54 securely cradle the drum 42 during a material extracting operation. A disc-shaped platen 56 fits into the chamber 50 with a flat driving surface 58 oriented perpendiculars to the longitudinal axis of the chamber 50 and correspondingly perpendicular to the longitudinal axis of a drum 42 held within the chamber 50.

The operation of feed system 12 can be described with reference to FIG. 1, FIG. 2, FIG. 4, FIG. 5 and FIG. 6. In operation, the press closures 52 and 54 are manually unlatched by activating clamps and opening closures 52 and 54. The drum hauler 44 is used to load a first drum 42 into the press cavity 60. The drum 42 is secured by a locator ring 62 at the base 64 of the chamber 50. The right closure 52 is first closed then the left closure 54 by engaging a door switch by an actuator (not shown). The cage chamber 66 is closed and the actuator secures the press closures 52 and 54 at the commencement of a batch system cycle. The press closures 52 and 54 take pressure of the hydraulic system from a drum 42 that may be thin-walled.

Each MEA 16 includes the container evacuator 22, feed tube 24 and cutting apparatus 26 and each is set on a respective floor scale 28. In each MEA 16, the feed tube 24 is connected through the disc shaped platen 56 to communicate with the press cavity 60. The figures, particularly FIG. 6 show the tube 24 double orificed 68 to the press chamber 50. The double orifice structure 68 is connected through the platen 56 on equal sides to the platen plunger 72. The platen 56 is driven by hydraulic plunger 72.

When a batch is set up by loading each chamber 50 of the feed system 12 battery, an operator can initiate the system cycle by a controller 30 touch screen located at a work station. The controller 30 can be a microprocessor or computer or the like for controlling the MEA 16 as hereinafter described. When a cycle is activated by an operator, a plunger 72 of each container evacuator 22 of the battery shown in FIG. 1 is activated via control lines 74 (FIG. 4 and FIG. 5). Then, as the screw conveyor 18 starts turning, the press platen 56 with connected feed tube 24 is forced by hydraulically driven plunger 72 to travel down into the drum 42 interior. As further illustrated in FIG. 6, as platen 56 traverses the drum 42 longitudinal axis within the press cavity 60, drum contents are displaced upward into the connecting double orifice structure 68 of the feed tube 24. As the platen 56 completes traversing the drum axis, all material is forced upward into the feed tube 24 to be eventually expelled from the feed tube discharge port 70.

A continuous material 210 discharged from port 70 as shown in FIG. 8, can be metered into portions by cutting apparatus 26 as the material 210 exits from the discharge port 70 to the conveyor 18 to charge to compounding system 14.

Metering can be accomplished by various cutting mechanisms, including a cutting head disposed at an outlet end of the feed tube. For example, Brandl, U.S. Pat. No. 5,797,516, incorporated hereto in its entirety discloses a cutting head formed by a knife that is detachably mounted in an axial direction and radial and tangential to the axial direction. The cutting head is rotatable relative to a feed tube about a common central longitudinal axis. A preferred cutting apparatus 26 is described hereinafter with reference to FIG. 7, FIG. 8 and FIG. 9.

The controller 30 of FIG. 1 is responsively connected to loss of weight scales 28 via lines 92 to sense loss of weight as material is expressed from the drums 42 to conveyor 18. The controller 30 computes a weight charged of material charged to the conveyor 18 by the difference between an initial weight of the MEA 16 and initially emplaced and full drum 42. In the embodiment of the drawings, the controller 30 can sense an initial total weight of all the MEAs 16 and emplaced full drums 42 of the MEA battery of for example, the three shown in FIG. 1. The controller 30 monitors the combined weight as material in the drums that is evacuated to the conveyor 18. The controller 30 contemporaneously calculates a weight of material charged to the conveyor 18 and hence to the compounding system according to a difference between the initial total weight and contemporaneously sensed total weight.

Figure 9:
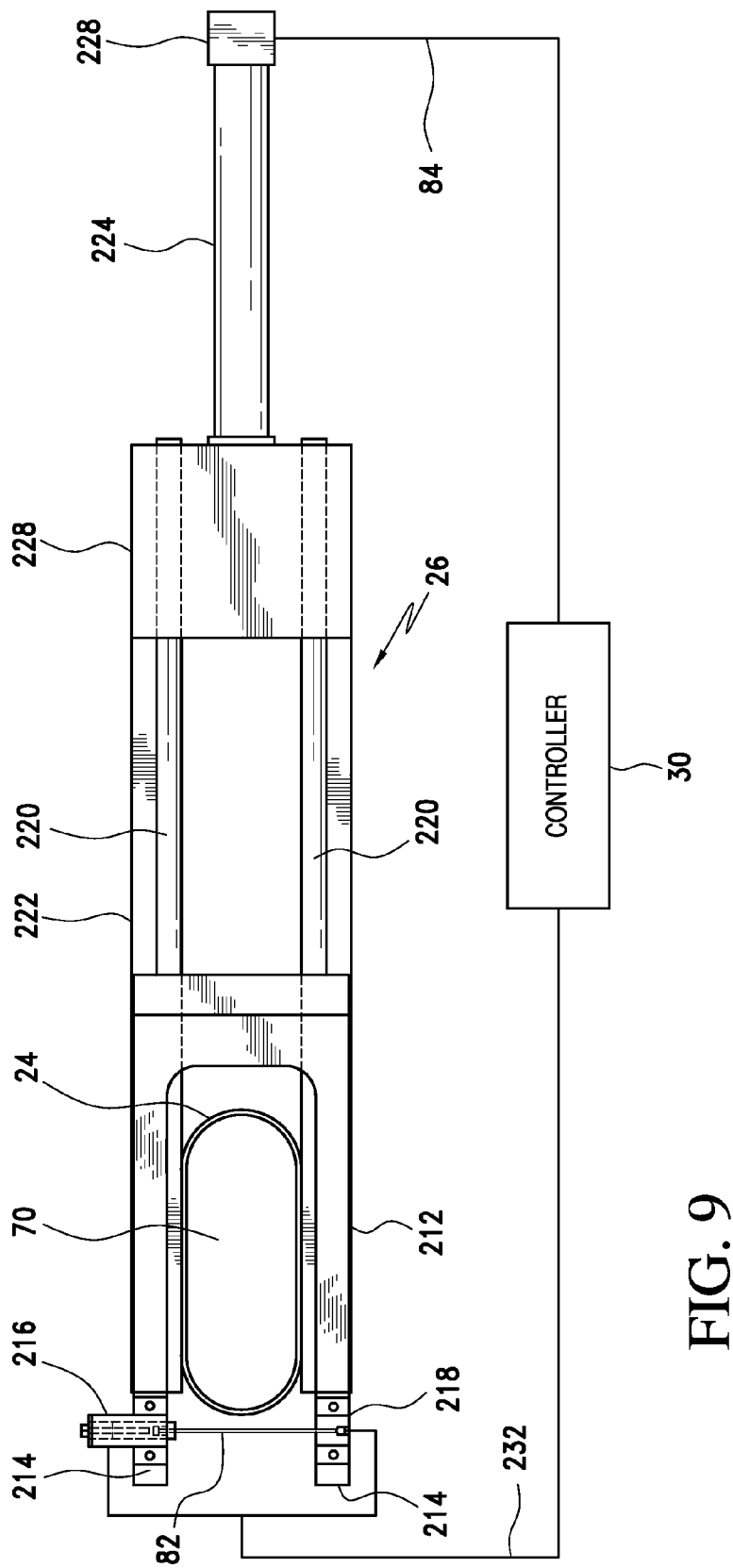
FIG. 9 is an elevation of the cutting apparatus with a controller.

In the FIG. 4, FIG. 5 and FIG. 6 embodiment, the MEA 16 includes a cutting apparatus 26 located at discharge port 70. A preferred cutting apparatus 26 is shown in FIG. 7, FIG. 8 and FIG. 9. In FIG. 7, FIG. 8 and FIG. 9, the cutting apparatus 26 includes tensioning fork 212 that secures cutting wire 82 to drive the wire 82 to cut material 210 exiting the feed tube discharge port 70. Suitable cutting wires 82 include high-carbon steel drawn "piano" wire, such as defined by ASTM A228. As examples, the wire can be as small as 0.006 inches (0.15 mm) in diameter, up to 0.192 inches (4.8 mm) in diameter. The cutting wire 82 is attached to the fork 212 at opposing tine ends 214 by tension guide block 216 and tensioner anchor 218. The tensioning fork 212 is connected to a pneumatic slide 220, which in turn is supported by mounting bracket 222. When pneumatically activated by line 224, the slide 220 propels the tensioning fork 212 along guides 220, which are oriented perpendicular to the longitudinal axis of the feed tube 24. The tension guide block 216 and tensioner anchor 218 at tine ends 214 secure the cutting wire 82 so that when the fork is activated by hydraulic motor 228, the cutting wire 82 traverses the feed tube 24 longitudinal axis at discharge port 70 to cut material 210. Tension (a measure of wire tautness) of the cutting wire 82 can be set at between 575 and 825 pounds or about 600 pounds The controller 30 can monitor the wire 82 tension to terminate operation of the press 22 and cutting apparatus 26 when tension on the wire 82 falls outside this range as a result of breakage or loosening of the wire 82.

In one embodiment, an input value representing a set point weight of viscous material to be charged to compounding system 14 is input into and stored in the controller 30. The floor scale 28 weighs an initial combined weight of the container evacuator 22, feed tube 24, cutting apparatus 26 and a container 42 with viscous material 210 that is placed within the chamber 50 of the evacuator 22. The controller 30 then stores this value in its data base. Also, the controller 30 can have a set of instructions to sense a progressing combined weight of the container evacuator 22, feed tube 24, cutting apparatus 26 and container 42 with viscous material 210 as material 210 is metered by the cutting apparatus 26 as shown in FIG. 7 and FIG. 8. Then, the controller 30 can calculate a material weight charged from the feed system 12 to the subsequent viscous material compounding system 14 according to a difference between the initial combined weight and the sensed progressing combined weight. The controller 30 terminates metering of material by the cutting apparatus 26 when the calculated material weight charged is within a predetermined range of the set point. For example, the controller 30 can terminate metering of material when the calculated material weight charged is within 2 pounds of the set point.

The cutting wire 82 speed can be controlled to cut material portion size. For example, the controller 30 can have a set of instructions to control the cutting apparatus 26 to make cuts initial of "football"-sized gum portions that can fit in a 14 inch interior diameter screw conveyor 18. Hence in an embodiment, the controller 30 has a set of instructions to control the driving mechanism 228 to cut initial portions of material between 12 to 18 pounds. As the metering progresses, the controller 30 calculates the material weight charged from the feed system 12 to the subsequent viscous material compounding system 14 according to the difference between the initial combined weight and the sensed progressing combined weight. Then as the controller 30 determines that the material weight charged is within a first predetermined range of the set point, the controller will increase the rate of the cutting apparatus 26. Hence, the controller can decrease the size and weight of a cut feed portion, for example to less than 12 to 18 pounds. The smaller size and weight portions permit the metering of material to be controlled more exactly than at a higher cutting rate. For example, the cutting rate can be increased and correspondingly the size and weight portions decreased when the controller calculates the material weight charged to be within 15 pounds of a set point. Then the increased cutting and the smaller size and weight portions are continued until terminated when the material weight charged is within a predetermined range of the set point, for example within 2 pounds of the set point.

FIG. 9 is an elevation of the cutting apparatus 26 with the controller 30. FIG. 9 together with FIG. 1, FIG. 7 and FIG. 8 illustrate further an embodiment relating to operation of cutting apparatus 26. FIG. 1 shows control line 84 from controller 30 to the cutting apparatus 26 and FIG. 7, FIG. 8 and FIG. 9 specifically show the control line 84 including both a driving mechanism 228 such as a hydraulic motor, control line 84 and sensing line 232. Controller 30 controls hydraulic motor 228 to provide a cut rate of the cutting apparatus 26 according to a calculated charged material weight. Initially, the cutting apparatus 26 can be programmed to make cuts of about "football" sized material, for example to fit in a 14" inner diameter screw conveyor 18. Once a piece of material is cut from the feed tube discharge port 70, floor scale 28 senses a contemporaneous weight and feeds this signal back to the controller 30. When the controller 30 senses a contemporaneous weight signal and calculates that a total charged weight is within a specified range of total material to be charged (for example within 15 pounds of "set point") to the compounding system 14, the controller can signal the cutting apparatus 26 via lines 84 to increase cut frequently to produce smaller "diced" pieces. The smaller diced pieces at approach to set point permit improved control of feed to attain a charged material weight within a prescribed tolerance range, for example +/−2 pounds for a batch.

In an embodiment, the controller 30 has a set of instructions to first store an input value representing a set point weight of silicone gum to be charged to compounding system 14. The controller 30 can control the driving mechanism 228 to cut initial portions of 12 to 18 pounds. The controller 30 then monitors the weight of silicone gum charged to the compounding system 14. The controller 30 then can increase the driving mechanism 228 operation to decrease the portions when the monitored charged material weight is for example, within 15 pounds of the set point and can terminate the driving mechanism 228 when the monitored charged material weight is for example within 2 pounds of the set point. This operation can be controlled by a controller 30 having a set of instructions a set of instructions to (i) store an input value representing a set point weight of viscous material 210 to be charged to a viscous material compounding system 14, (ii) sense an initial combined weight of the container evacuator 22, feed tube 24, cutting apparatus 26 and a container 42 with viscous material 210; (iii) sense a progressing combined weight of the container evacuator 22, feed tube 24, cutting apparatus 26 and container 42 with viscous material 210 as material 210 is metered by the cutting apparatus 26; (iv) calculate a material weight charged from the metering system 26 to a subsequent viscous material compounding system 14 according to a difference between the initial combined weight and the sensed progressing combined weight; (v) increase the rate of metering of material by the cutting apparatus 26 when the calculated material weight charged is within a first predetermined range of the set point; and (v) terminate the material charging when a calculated charged material weight is within a second predetermined range of the set point.

Second, the controller 30 senses tension of cutting wire 82 to provide a failure cut off mechanism to the cutting apparatus 26. The cutting wire 82 is held across fork 212 by tension guide block 216 and tensioner anchor 218 at a predetermined tension appropriate to cleanly cut material 210 without disruption to maintain a steady drop of material aliquot to conveyor 18. When the controller 30 senses a drop in tension on account of a loosening or breaking of the cutting wire, the controller 30 terminates operation of the MEAs 16 to avoid overrun of the hydraulic motor and misfeed of silicone gum material 210 to conveyor 18 and subsequently to the compounding system 14.

Continuing with reference to FIGS. 1 through 6, as a drum 42 evacuation process is completed, door clamps of the hinged closures 52 and 56 open and a controller 30 Run Screen displays "NEW DRUM." A beacon light mounted on the container evacuator 22 turns yellow, indicating the drum 42 is ready to be changed. The chamber 50 hinged closures 52 and 56 open the hydraulic unit motor terminates. The door clamps are opened manually and the empty drum is removed, typically with the drum hauler. The press is reloaded with a drum the process repeated.

As material is charged from the presses to the screw conveyor, the conveyor is turning at low rpms to feed the material to the mixer. The screw is programmed to stop turning 90 seconds after the last press makes its last cut. We have determined this time to be adequate to clear all material from the conveyor.

Conveyor 18 transports and drops the silicone gum to chute 20, which drops the material into a material compounding system 14. In one silicone compounding process, a heat cured rubber (HCR) composition can be produced by kneading a high-viscosity polydiorganosiloxane, an inorganic filler and additives by means of a batch kneading machine such as the high intensity Banbury mixer 32 or a low intensity double arm dough mixer. In this process, silicone gum, inorganic filler, treating agents and additives are batch mixed until desired properties are obtained. In Kasahara et al., U.S. Pat. No. 5,198,171, a preconcentrate of silicone gum, inorganic filler and treating agents is formed by a high speed mechanical shearing mixer. The resulting premix is further compounded in a same-direction double screw extruder. A premix is formed in a first step wherein a silicone gum having a viscosity at 25° C. of $1 \times 10^5$ cP or more, an inorganic filler and a treating agent are mixed in a high speed mechanical shearing machine to provide a flowable particulate mixture in which each ingredient is present in a substantially uniform, finely dispersed state. The flowable particulate mixture is then fed at a constant feed rate into a kneading and extruding machine that has two screws rotating in the same direction.

As the material exits from the end of the conveyor, it falls into a chute. It tumbles down the chute directly into the mixing chamber of a Banbury mixer where feed is mixed with filler and additives. In the FIGS. 1, 2 and 3 embodiment, the silicone gum drops through chute 20 to compounding system 14, which includes mixer 32 such as a Banbury, roll mill 34, conveyor belt 36 and compounder 38. The material dropped from chute 20 may be a feed of silicone gums of varying physical properties such as varying viscosity.

In the mixer 32 such as a Bepex Turbolizer, fumed silica, the silicone gum and a treating agent can be added to form a densified polymer/filler mass. After the gum feed is mixed, it is dropped into the nip 46 of roll mill 34 where the material is rolled into a strip form. After a drop, the PLC (automatic system?) verifies that the mixer drop door has opened, then reclosed and is ready for feed. For any residual material that hangs in the chute, the "pusher" is programmed to sweep a few seconds after the conveyor stops. This serves to scrape down the chute, and ensure all material gets into the mixer to correctly formulate the batch.

The mill imparts a final mix to fully incorporate filler and to cool material. Then, the material is stripped from the mill a strip form. The strip form is fed by means of conveyor belt 36 into compounder 38, which may be an extruder. The compounder 38 serves to clean and form the material for packaging. The material can be packaged and boxed through an automated cut, weigh and packaging system.

The feed system and method of the invention can be used in conjunction with a process to produce a heat cured rubber (HCR). An HCR composition can be produced by kneading a high-viscosity polydiorganosiloxane, the inorganic filler and additives by means of a batch kneading machine such as a high intensity Banbury mixer or a low intensity double arm dough mixer. In this process, polydiorganosiloxane, inorganic filler, treating agents and additives are batch mixed until desired properties are obtained. In Kasahara et al., U.S. Pat. No. 5,198,171, a preconcentrate of polydiorganosiloxane, inorganic filler and treating agents is formed by a high speed mechanical shearing mixer. The resulting premix is further compounded in a same-direction double screw extruder. The premix is formed in a first step wherein a diorganopolysiloxane having a viscosity at 25° C. of $1 \times 10^5$ cP or more, an inorganic filler and a treating agent are mixed in a high speed mechanical shearing machine to provide a flowable particulate mixture in which each ingredient is present in a substantially uniform, finely dispersed state. The flowable particulate mixture is then fed at a constant feed rate into a kneading and extruding machine that has two screws rotating in the same direction. A vulcanizing agent or catalyst can be added and the composition heat cured to fabricate silicone rubber moldings such as gaskets, medical tubing and computer keypads.

The following Example is illustrative and should not be construed as a limitation on the scope of the claims.

EXAMPLE

This EXAMPLE is a combined description of press experiments at Schwerdtel US headquarters (New Jersey), ProSys Corporation (Missouri), and at GE Silicones Waterford, N.Y.

Experiments on the shaftless screw conveyor were conducted at GE Silicones Waterford using Martin Sprocket equipment.

A viscous material feed system as schematically illustrated in the drawings included a Schwerdtel S 6-F drum press mounted to Vishay BLH floor scale that measured material flow according to loss of weight. The Schwerdtel S 6-F press included a hydraulic pressure driven cylinder and platen that drives a platen into the 55 gallon drum.

The feed system included a feed tube to receive material expressed from a drum by the press and a pneumatic solenoid operated cutting apparatus that metered material from the feed tube to a 12"×24' shaftless screw conveyor according to loss of weight sensed by a programmed logic computer (PLC) from the scale. The screw conveyor interfaced to a chute. The chute permitted material to fall via gravity directly to a Banbury mixer. Material remaining in the chute was cleared by a pneumatic pusher prior to each mix (GE design and fabrication). The system initiation was controlled by operators at two (2) QuickPanel LM90 touch screens.

In operation, an operator first entered a cut portion amount and a set point into a system controller that included the PLC. The set point represented a target batch of silicone gum to be charged to a Banbury mixer, which was part of a silicone gum compounding system. In this EXAMPLE, the cut portion amount was a target 25 pounds.

A pallet of four (4) fifty-five (55) gallon drums of polymer (Viscosity Range 150,000 to 900,000 Poise) was placed on the drum carousel. The 55-gallon straight-sided steel drums were delivered by the carousel and one drum was loaded into the Schwerdtel S 6-F drum press using an Easy Lift Equipment Drum Hauler unit. The Schwerdtel S 6-F drum press was controlled by a GE Fanuc 90/30 PLC. Material was then displaced, from the drum to the feed tube by the hydraulic Schwerdtel gum press.

The operator pressed a START OR RESTART BATCH button of the controller to commence operation. As the screw conveyor started turning, the hydraulically driven press platen commenced traveling down into the drum. As platen traversed the drum, drum contents were squeezed upward into the feed tube. As the platen completed traversing the drum axis, all material was forced upward into the feed tube. As material exited the feed tube, a pneumatic solenoid operated cutting apparatus cut the material into 25 pound pieces that then fell into a 12"×24' shaftless screw conveyor to charge to a Banbury mixer. The pneumatic solenoid operated cutting apparatus included a tensioned cutting wire that was monitored by the PLC to terminate the cutting wire system with loss of tension.

A batch of material flow from conveyor to the Banbury mixer was measured by loss of weight detected by the Vishay BLH load cells. A combined weight of presses, feed tubes, cutting mechanisms and material-containing drums was registered by the control system as a First weight. The control system monitored a charged weight of silicone gum to the Banbury by registering progressing weight as silicone gum was pressed from the drums and expelled through the feed tubes and cutting apparatus. The control system displayed a differential between the first weight and registered progressive weights that represented a charged silicone gum weight. As the charged silicone gum weight was within 15 pounds of the set point, the rate of cutting was increased to cut smaller gum portions. The smaller gum portions enabled a system operator to observe a progressing approach to the set point. The operator monitored the differential weight and terminated the batch operation when the differential weight registered within a 2 pound range of the set point.

The EXAMPLE illustrates control of material charge to a compounding system according to a cutting apparatus of the invention.

The invention includes changes and alterations that fall within the purview of the following claims. The foregoing examples are merely illustrative of the invention, serving to illustrate only some of the features of the present invention. For example, the invention includes a controller with a set of instructions: to refer to a look-up data base to determine a set point for a material to be charged to a compounding system; sensing an initial combined weight of a material extracting apparatus and a container with material; signaling commencement of the material extracting apparatus operation to evacuate the material from the container; sensing a progressing combined weight of the material extracting apparatus and the container with material; calculating a charged material weight according to a difference between the initial combined weight and the sensed progressing combined weight; and terminating the material extracting apparatus operation when a calculated charged material weight is within a specified range of the set point.

The appended claims are intended to claim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention.

As used in the claims, the word "comprises" and its grammatical variants logically also subtend and include phrases of varying and differing extent such as for example, but not limited thereto, "consisting essentially of" and "consisting of."

Where necessary, ranges have been supplied, those ranges are inclusive of all sub-ranges there between. Such ranges may be viewed as a Markush group or groups consisting of differing pairwise numerical limitations which group or groups is or are fully defined by its lower and upper bounds, increasing in a regular fashion numerically from lower bounds to upper bounds. It is to be expected that variations in these ranges will suggest themselves to a practitioner having ordinary skill in the art and where not already dedicated to the public, those variations should where possible be construed to be covered by the appended claims.

It is also anticipated that advances in science and technology will make equivalents and substitutions possible that are not now contemplated by reason of the imprecision of language and these variations should also be construed where possible to be covered by the appended claims.

All United States patents (and patent applications) referenced herein are herewith and hereby specifically incorporated by reference in their entirety as though set forth in full.

The invention includes changes and alterations that fall within the purview of the following claims.

What is claimed is:

1. A viscous material metering system, comprising:
   a cutting apparatus comprising a tensioning fork having a main body diverging into extending tines; a cutting wire tensioned between the tines of the fork; a driving mechanism operatively connected to the tensioning fork to drive the fork and tensioned cutting wire; tension guide block and tensioner anchor located on opposing tine ends of the fork and tensioning the cutting wire across the tines; a sensor connected to the tension guide block or tensioner anchor that senses tension of the cutting wire; and a controller controllably connected to the driving mechanism and having a set of instructions to control the driving mechanism to drive the fork to cut a continuous viscous material into portions of a predetermined size or weight for metering to a viscous material compounding system.

2. The viscous material metering system of claim 1, comprising a tension guide block and tensioner anchor located on opposing tine ends of the fork and tensioning the cutting wire across the tines and a sensor connected to the tension guide block or tensioner anchor that senses tension of the cutting wire and a controller responsive to the sensor and having a set of instructions to terminate the driving mechanism if the sensor senses a reduced tension.

3. The viscous material metering system of claim 1, comprising a controller having a set of instructions to (i) store an input value representing a set point weight of silicone gum to be charged to the compounding system, (ii) monitor a weight of silicone gum charged to the compounding system and (iii) increase the drive to the fork when the monitored charged material weight is within a specified range of the set point.

4. The viscous material metering system of claim 1, comprising a controller having a set of instructions to (i) store an input value representing a set point weight of silicone gum to be charged to the compounding system, (ii) monitor a weight of silicone gum charged to the compounding system and (iii) increase the drive to the fork when the monitored charged material weight is within a first specified range of the set point and (iv) terminate the driving mechanism when the monitored charged material weight is within a second specified range of the set point.

5. The viscous material metering system of claim 1, further comprising a container evacuator located on a loss of weight scale; a feed tube that receives material expressed from a container by the container evacuator; and the cutting apparatus is located at a discharge port of the feed tube to meter material from the feed tube to a processing system according to loss of weight sensed by the scale.

6. The viscous material metering system of claim 1, further comprising a container evacuator located on a loss of weight scale and comprising a chamber to hold a container and a plunger axially and slidably accommodated within the chamber;
a feed tube that receives material expressed from a container by the container evacuator; and
the cutting apparatus, located at a discharge port of the feed tube to meter material from the feed tube to a processing system according to loss of weight sensed by the scale.

7. The viscous material metering system of claim 1, further comprising a container evacuator comprising a chamber to hold a material filled container and a plunger comprising a piston driven platen that is axially and slidably accommodated within the chamber to express material from the container into a feed tube extending from the chamber with the cutting apparatus; wherein the cutting apparatus is located at a discharge port of the feed tube and the container evacuator, feed tube and cutting apparatus are located on a loss of weight scale; and the cutting apparatus meters material from the feed tube to a processing system according to loss of weight sensed by the scale; wherein the container contains a viscous material, which is expressed by the container evacuator.

8. The viscous material metering system of claim 1, further comprising a container evacuator located on a loss of weight scale and comprising a chamber to hold a container and a plunger axially and slidably accommodated within the chamber; a feed tube that receives material expressed from a container by the container evacuator; and the cutting apparatus, located at a discharge port of the feed tube to meter material from the feed tube to a processing system according to loss of weight sensed by the scale;
wherein the controller has a set of instructions to (i) store an input value representing a set point weight of viscous material to be charged to the viscous material compounding system, (ii) sense an initial combined weight of the container evacuator, feed tube, cutting apparatus and a container with viscous material; (iii) sense a progressing combined weight of the container evacuator, feed tube, cutting apparatus and a container with viscous material as material is metered by the cutting apparatus; (iv) calculate a material weight charged from the metering system to a subsequent viscous material compounding system according to a difference between the initial combined weight and the sensed progressing combined weight; and (v) terminate the material charging when a calculated charged material weight is within a specified range of the set point.

9. The viscous material metering system of claim 1, wherein the controller has a set of instructions to (i) store an input value representing a set point weight of silicone gum to be charged to the compounding system, (ii) control the driving mechanism to cut initial portions of 12 to 18 pounds, monitor a weight of silicone gum charged to the compounding system (iii) increase the driving mechanism operation to decrease the portions when the monitored charged material weight is within 15 pounds of the set point and terminate the driving mechanism when the monitored charged material weight is within 2 pounds of the set point.

10. A viscous material metering method, comprising:
determining a sequential portion of viscous material to be metered from a container to a viscous material compounding system;
determining a set point weight of material to be charged to the viscous material compounding system;
metering portions of the continuous viscous material to the compounding system by cutting the material substantially perpendicular to a longitudinal axis of an elongated continuous viscous material feed expressed from the container; and
sensing a weight of the viscous material metered to the viscous material compounding system as the metering proceeds;
comparing weight to the set point weight;
increasing a rate of metering portions when the compared weight is within a first predetermined range of the set point weight; and
terminating the metering when the compared weight is within a second predetermined range of the set point weight.

11. The viscous material metering method of claim 10, comprising:
increasing a rate of metering portions when the compared weight is within 15 pounds of the set point weight; and
terminating the metering when the compared weight is within 2 pounds of the set point weight.

12. The viscous material metering method of claim 10, comprising:
sensing an initial combined weight of a container evacuator, feed tube, cutting apparatus and a container with viscous material;
sensing a progressing combined weight of the container evacuator, feed tube, cutting apparatus and a container with viscous material as material is metered to the viscous material compounding system;
calculating a material weight charged from the container evacuator, feed tube, cutting apparatus and a container to the viscous material compounding system according to a difference between the initial combined weight and the sensed progressing combined weight; and terminating the material charging when a calculated charged material weight is within a specified range of the set point.

13. The viscous material metering method of claim 10, wherein the portion is determined according to the diameter of a conveyor to the compounding system.

14. The viscous metering method of claim 10, comprising cutting the material with a wire held in tension at an initial tension force; sensing the tension of the wire as the metering proceeds; and terminating the cutting if the tension is sensed at less than the initial tension force.

15. A method of controlling a feed to a processing system, comprising:

establishing a material feed session set point range;

feeding a viscous material in the session by dicing a steadily moving material into a portion that drops sequentially into the processing system;

monitoring a session total of material dropped into the processing system;

comparing the session total of material to the session set point range;

increasing a cutting rate of the moving material to decrease each cut portion quantity as the session set point range is approached; and terminating the material feed of the session when the total material is within the session set point range.

* * * * *